(12) United States Patent
Ito et al.

(10) Patent No.: US 8,626,623 B2
(45) Date of Patent: Jan. 7, 2014

(54) IMAGE PROCESSING APPARATUS, IMAGE PROCESSING METHOD, AND RECORDING MEDIUM

(75) Inventors: Takayuki Ito, Kanagawa (JP); Masanori Hirano, Kanagawa (JP); Yoshiaki Hoshino, Kanagawa (JP); Yasunobu Takagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1057 days.

(21) Appl. No.: 12/168,401

(22) Filed: Jul. 7, 2008

(65) Prior Publication Data

US 2009/0018881 A1 Jan. 15, 2009

(30) Foreign Application Priority Data

Jul. 10, 2007 (JP) ................................. 2007-181506

(51) Int. Cl.
*G06Q 40/00* (2012.01)

(52) U.S. Cl.
USPC ............. 705/35; 358/1.14; 358/3.1; 705/400; 705/408

(58) Field of Classification Search
USPC ...................... 347/19, 106, 7, 14, 84; 400/61; 358/1.14, 3.1, 501; 705/35, 400, 408; 101/485, 181, 248
See application file for complete search history.

(56) References Cited

U.S. PATENT DOCUMENTS

| | | | |
|---|---|---|---|
| 6,027,200 A * | 2/2000 | Takahashi et al. | 347/19 |
| 7,083,247 B2 | 8/2006 | Yoshida et al. | |
| 2002/0076245 A1 * | 6/2002 | Aiyama | 400/61 |
| 2002/0089686 A1 * | 7/2002 | Kitahara et al. | 358/1.14 |
| 2005/0200900 A1 | 9/2005 | Hirano | |
| 2006/0092296 A1 | 5/2006 | McGrath et al. | |
| 2006/0098232 A1 | 5/2006 | Nakano et al. | |
| 2006/0181562 A1 | 8/2006 | Hirano et al. | |

FOREIGN PATENT DOCUMENTS

| | | |
|---|---|---|
| JP | 7-107280 | 4/1995 |
| JP | 8-156247 | 6/1996 |
| JP | 8-267828 | 10/1996 |
| JP | 11-112789 | 4/1999 |
| JP | 3039273 | 3/2000 |
| JP | 2002-268861 | 9/2002 |
| JP | 2005-35062 | 2/2005 |
| JP | 2005-170010 | 6/2005 |
| JP | 2006-68982 | 3/2006 |
| JP | 2007-69614 | 3/2007 |

\* cited by examiner

*Primary Examiner* — Behrang Badii
(74) *Attorney, Agent, or Firm* — Oblon, Spivak, McClelland, Maier & Neustadt, L.L.P.

(57) ABSTRACT

A disclosed image processing apparatus includes an adjusting unit configured to convert input image data into image formation data, an arithmetic unit configured to calculate an image formation ink cost based on the converted image formation data, and a determining unit configured to compare the calculated image formation ink cost with a black-and-white image formation ink cost, wherein the calculated image formation ink cost is fixed based on a determination result of the first determining unit.

19 Claims, 11 Drawing Sheets

IMAGE PROCESSING APPARATUS, IMAGE PROCESSING METHOD, AND RECORDING MEDIUM

BACKGROUND OF THE INVENTION

1. Field of the Invention

The present invention relates to an image processing apparatus, an image processing method, and recording medium storing an image processing program that allow users to save ink according to specifications.

2. Description of the Related Art

Image processing apparatuses for processing image data include personal computers and work stations. The image processing apparatuses produce image data including various objects (characters, fills, lines, photographs, etc.) using application software.

Image forming apparatuses, such as printers, facsimile machines, copiers, and multifunction peripherals, form images from the image data and output the images. Image forming methods (e.g., an inkjet recording method and an electrophotographic method), are used that form images using an image formation material such as recording liquid (ink) and toner.

If the image data contains many color objects, the amount of the image formation material to be used such as color ink and color toner is increased, resulting in an increase in the cost of the image formation material.

Some related-art image forming apparatuses have an image formation material save mode called, e.g., an ink save mode or a toner save mode for reducing the usage of the image formation material. If the image formation material save mode is selected, a predetermined process is performed to reduce the amount of the image formation material to be used for outputting images.

For example, Japanese Patent Laid-Open Publication No. 08-267828 (Patent Document 1) discloses a technique that decimates image data to reduce the number of pixels of the image, thereby saving ink and toner.

Japanese Patent Laid-Open Publication No. 2005-35062 discloses a technique that controls a drive signal for an inkjet recording head to control the ink ejection amount, thereby saving ink.

Japanese Patent Laid-Open Publication No. 2002-268861 discloses a technique that determines a print parameter according to the image formation cost specified by a user, thereby controlling the cost of the image formation material.

An image forming apparatus, an image processing apparatus, and an image processing method disclosed in Patent Document 1 perform decimation for each object, thereby saving the image formation material while maintaining the visibility of characters and the like. In some cases, however, the actual cost does not match the image formation material cost desired by a user.

An image forming apparatus, an image processing apparatus, and an image processing method disclosed in Patent Document 2 save the image formation material by reducing the ink ejection amount. Therefore, the resulting image might be too light to satisfy the specification of the image desired by a user.

An image forming apparatus, an image processing apparatus, and an image processing method disclosed in Patent Document 3 require a user to specify the image formation material cost each time printing is performed. Therefore, the number of operating steps is increased, resulting in a burden on the user.

That is, the problem with the related-art image formation material save mode is that it is not possible to adjust the image formation material cost desired by a user each time recording a page without increasing burden on the user, and provide a recording image that satisfies the specifications desired by the user.

SUMMARY OF THE INVENTION

In view of the foregoing, the present invention is directed toward providing an image processing apparatus, an image processing method, and a recording medium storing an image processing program that save color image formation ink by adjusting the amount of an image formation material based on the image formation ink cost for black-and-white recording.

According to an embodiment of the present invention, there is provided an image processing apparatus that comprises an adjusting unit configured to convert input image data into image formation data, an arithmetic unit configured to calculate an image formation ink cost based on the converted image formation data, and a determining unit configured to compare the calculated image formation ink cost with a black-and-white image formation ink cost, wherein the calculated image formation ink cost is fixed based on a determination result of the first determining unit.

According to another embodiment of the present invention, there is provided an image processing method that comprises an adjusting step of converting input image data into image formation data; an arithmetic step of calculating an image formation ink cost based on the converted image formation data; a determining step of comparing the calculated image formation ink cost with a black-and-white image formation ink cost; and a fixing step of fixing the calculated image formation ink cost based on a determination result in the determining step.

According to still another embodiment of the present invention, there is provided a computer-readable recording medium storing an image processing program. The program includes computer-executable instructions for executing a method comprising an adjusting step of converting input image data into image formation data; an arithmetic step of calculating an image formation ink cost based on the converted image formation data; a determining step of comparing the calculated image formation ink cost with a black-and-white image formation ink cost; and a fixing step of fixing the calculated image formation ink cost based on a determination result in the determining step.

According to an embodiment of the present invention, there are provided an image processing apparatus, an image processing method, and a recording medium storing an image processing program that save color image formation ink by adjusting the amount of an image formation material based on the image formation ink cost for black-and-white recording, and thus place little burden on a user and achieve an image formation ink cost and a recording image that satisfy the specifications desired by the user.

DETAILED DESCRIPTION OF THE PREFERRED EMBODIMENT

An image processing apparatus according to an embodiment of the present invention realizes the following:

Saving color image formation ink by adjusting, each time recording a page, the amount of image formation ink for each object based on the image formation ink cost for black-and-white recording, thus placing little operational burden on a user and achieving an image formation ink cost and a recording image that satisfy the specifications desired by a user.

The following is an example of a preferred embodiment of the present invention that realizes the above-described image processing apparatus.

The image processing apparatus includes a recording head and is configured to adjust, each time recording a page, the image formation ink amount based on the image formation ink cost for black-and-white recording. The recording head includes a droplet ejection head having plural nozzle arrays for ejecting inks of different colors or plural droplet ejection heads for ejecting inks of different colors.

The image formation ink amount is adjusted for each type of object of a color image. If the object to be output is a character and has a size smaller than a predetermined size, adjustment of the ink amount is not performed. If the object is not a character, adjustment of the ink amount is performed regardless of the size of the object.

A unit for adjusting the image formation ink amount may be provided that corrects R, G, and B values of input image data, wherein corrected values R', G', and B' of the R, G, and B values are represented by R'=R_max−p×(R_max−R), G'=G_max−p×(G_max−G), and B'=B_max−p×(B_max−B), respectively, in which R_max, G_max, and B_max represent maximum level values of the R, G, and B values, respectively, of the input image data and p is a coefficient (p being equal to or greater than 0 and less than or equal to 1.0), and preferably regulates the image formation ink amount using a total amount regulating value multiplied by a coefficient r (r being equal to or greater than 0 and less than or equal to 1.0). The upper/lower limits and the initial values of the coefficients are preferably specified.

Alternatively, another unit for adjusting the image formation ink amount may be provided that corrects C, M, Y and K values of input image data by multiplying the C, M, Y, and K values by a coefficient q (q being equal to or greater than 0 and less than or equal to 1.0), and preferably regulates the image formation ink amount using a total amount regulating value multiplied by a coefficient r (r being equal to or greater than 0 and less than or equal to 1.0). The upper/lower limits and the initial values of the coefficients are preferably specified.

A unit for adjusting the image formation ink amount to a target amount may preferably be provided that resets and changes repeatedly the coefficient p or q and the coefficient r until the image formation ink cost, which is calculated by multiplying the adjusted image formation ink amount by the ink cost per unit ink amount, becomes equal to s % of the image formation ink cost for black-and-white image recording. The s % is preferably 100% because when s is 100 the color image formation ink cost becomes equal to the black-and-white image formation ink cost. The ink cost per unit ink amount may be acquired from an ink cartridge.

The above-described image processing apparatus may preferably be configured as described below.

It should be understood that the present invention is not limited to the below-described configuration of the image processing apparatus and variations and modifications may be made without departing from the scope of the invention.

According to the below-described configuration of the image processing apparatus, an inkjet recording apparatus is applied to an image forming unit, for example.

An example of a configuration of the inkjet recording apparatus applied to the image processing apparatus is described with reference to FIGS. 1 through 4.

Figure 1:
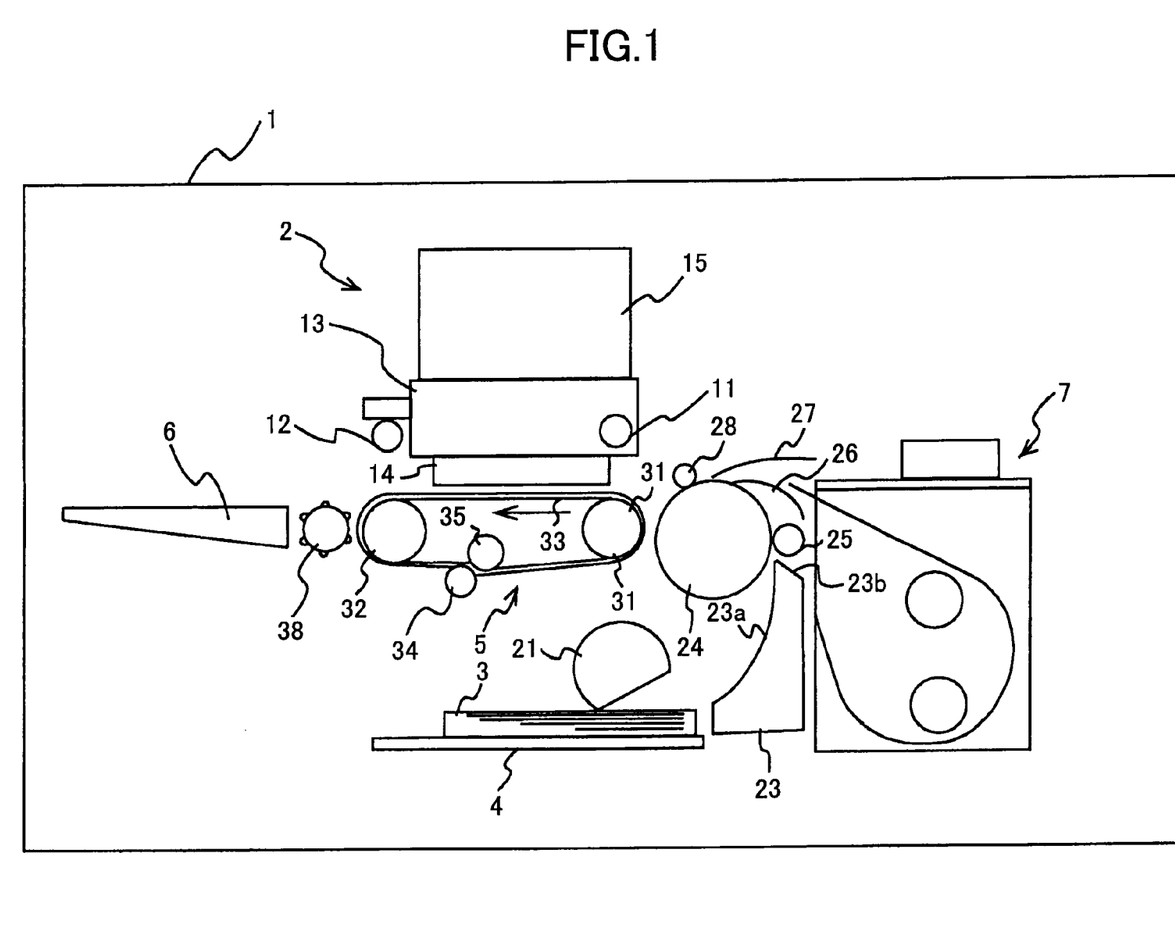
FIG. 1 is a schematic diagram illustrating a mechanical section of an inkjet recording apparatus as an example of an image processing apparatus according to an embodiment of the present invention.

FIG. 1 is a schematic diagram illustrating an entire mechanical section of an inkjet recording apparatus according to an embodiment of the present invention.

Figure 2:
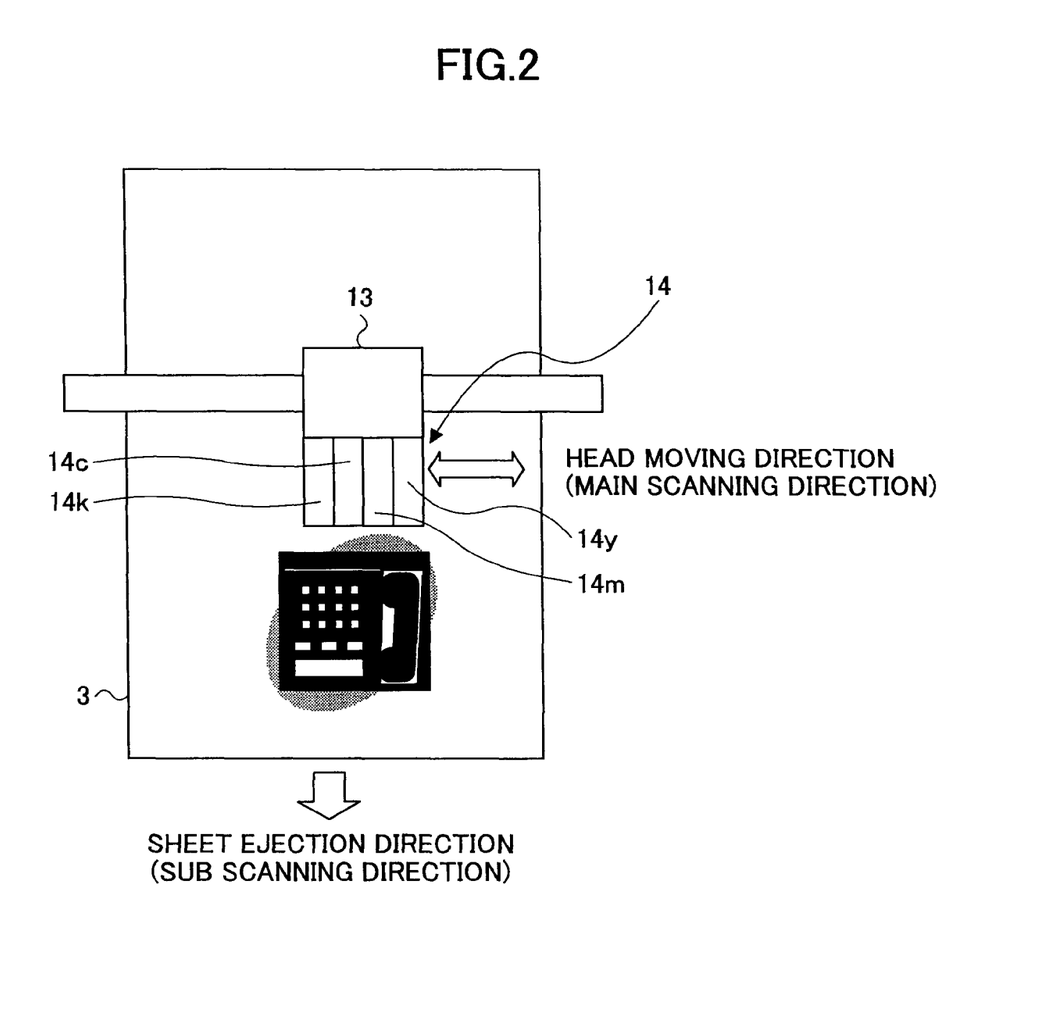
FIG. 2 is a schematic plan view illustrating a part of the mechanical section.

FIG. 2 is a schematic plan view illustrating a part of the inkjet recording apparatus.

Figure 3:
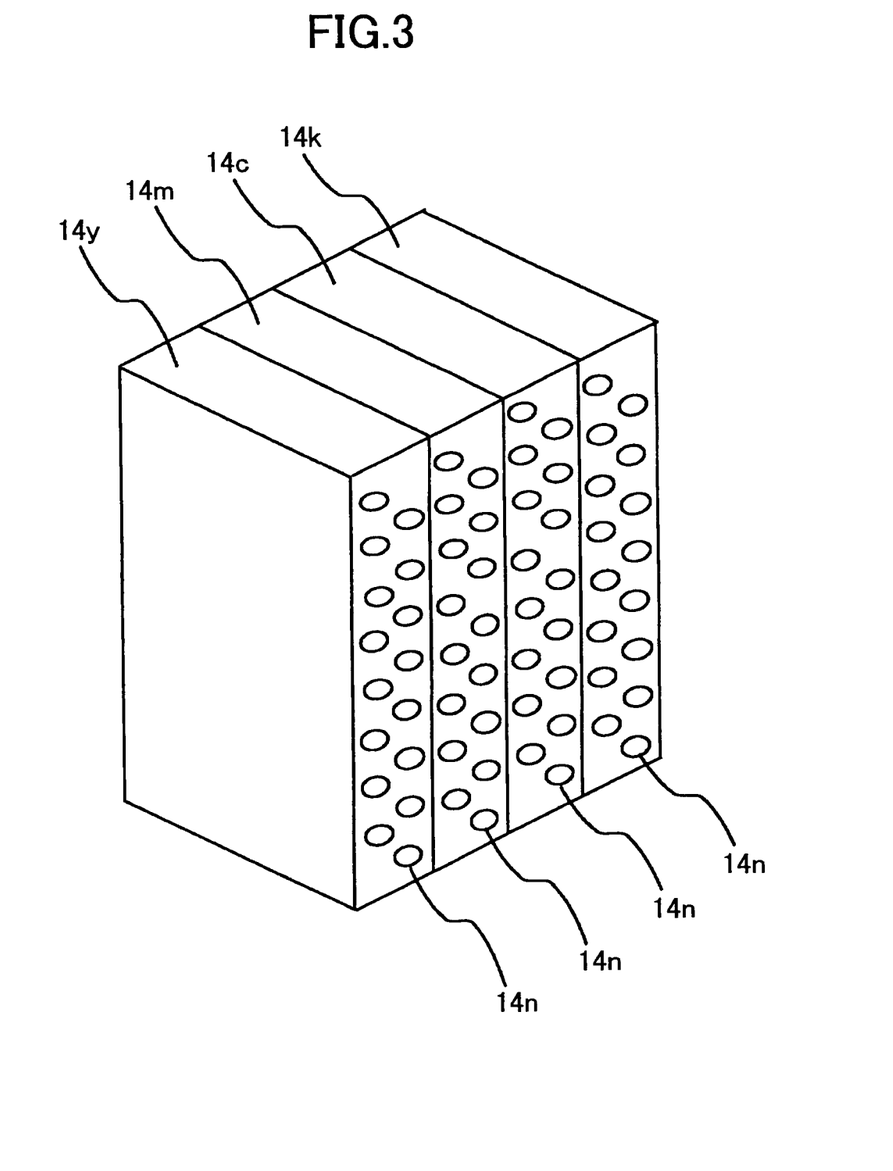
FIG. 3 is a schematic perspective view for explaining a configuration of a head of the apparatus.

FIG. 3 is a schematic perspective view for explaining a diagram illustrating a head configuration of the inkjet recording apparatus.

Figure 4:
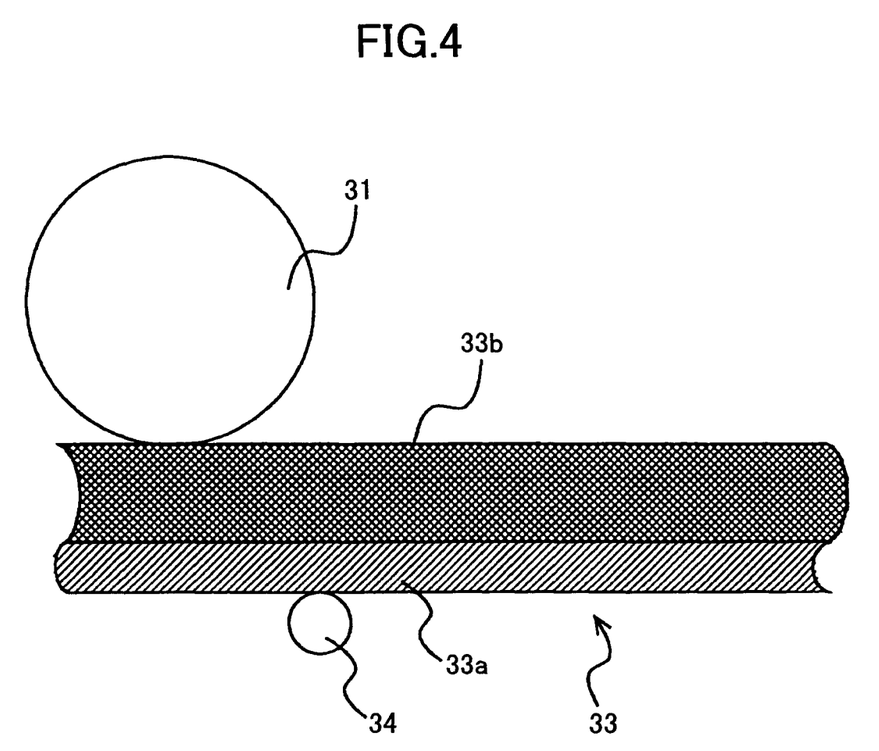
FIG. 4 is a diagram for explaining an example of a transport belt of the apparatus.

FIG. 4 is a cross-sectional schematic diagram illustrating a transport belt of the inkjet recording apparatus.

The inkjet recording apparatus includes an image forming unit 2 inside an apparatus body 1. A sheet feed tray 4 capable of holding a large number of sheets 3 of recording media (hereafter referred to simply as "sheets") is provided in the lower side of the apparatus body 1. The inkjet recording apparatus loads the sheet 3 from the sheet feed tray 4, records a predetermined image using the image forming unit 2 while transporting the sheet 3 using a transport mechanism 5, and ejects the sheet 3 to a sheet ejection tray 6 attached to a side of the apparatus body 1.

The inkjet recording apparatus further includes a duplex unit 7, which is detachable from the apparatus body 1. Upon performing duplex printing, the inkjet recording apparatus prints one side (front side) of the sheet 3, loads the sheet 3 into the duplex unit 7 by transporting the sheet 3 in the opposite direction using the transport mechanism 5, and rotates the sheet 3 to pass the sheet 3 again to the transport mechanism 5, prints the other side, and ejects the sheet 3 to the sheet ejection tray 6.

The image forming unit 2 causes a carriage 13, which is slidably held by guide shafts 11 and 12, to move (i.e., to perform main scanning) in a direction orthogonal to a transport direction of the sheet 3 using a main scanning motor (not shown). On the carriage 13, a recording head 14 is mounted that includes plural droplet ejection heads. Each droplet ejection head has plural nozzle openings 14n (see FIG. 3) as ejection ports for ejecting droplets. Further, an ink cartridge 15 is detachably mounted and is configured to supply liquid to the recording head 14. In an alternative embodiment, a sub tank, to which a main tank supplies ink, may be mounted in place of the ink cartridge 15.

As shown in FIGS. 2 and 3, the recording head 14 includes, as the droplet ejection heads, four independent inkjet heads 14y, 14m, 14c, and 14k for ejecting ink droplets of yellow (Y), magenta (M), cyan (C), and black (B), respectively. In an alternative embodiment, one or more heads each having plural nozzle arrays for ejecting different colors of ink droplets may be used in place of the droplet ejection heads. The number of colors and the order of the arrangement are not limited to those illustrated in this example.

The recording head 14 further includes an energy generation mechanism for ejecting ink. Examples of an energy generation mechanism of the recording head 14 include a piezoelectric actuator such as a piezoelectric element; a thermal actuator that utilizes a phase change due to film boiling of liquid using an electrothermal conversion element such as a heating element; a shape memory alloy actuator that utilizes a metallic phase change due to a temperature change; and an electrostatic actuator using electrostatic force.

The electrothermal conversion element used herein has non-linear properties. That is, the resistance value of the electrothermal conversion element does not easily change in response to application of low voltage, but greatly changes in response to application of voltage higher than a predetermined level.

In the case of electrothermal conversion elements having linear properties, noise voltage is applied to non-selected heating units, resulting in a waste of energy. Furthermore, the noise voltage affects the drive voltage, resulting in a change in the ink ejection amount, which would affect an image to be recorded. In particular, in the case of inkjet recording heads that apply voltage to plural vertical lines and plural horizontal lines and thus selectively drive heating units arranged on intersections of the vertical lines and the horizontal lines in a matrix form, a voltage lower than the voltage might be applied to non-selected heating units while driving selected heating units. If the voltage applied to the non-selected heating units is a forward voltage, the non-selected heating units generate unwanted heat. If the non-selected heating units are selected and heated for ejecting ink, accumulation of unwanted heat causes excessive heat and ejection of an excessive amount of ink. As a result, the ink ejection amount varies from nozzle to nozzle.

Use of electrothermal conversion elements having non-linear properties prevents the heating elements from generating unwanted heat due to application of a voltage lower than the drive voltage such as noise, and thus prevents a variation in the ink ejection amount, resulting in reduced graininess and improved gradation of the printout. Furthermore, it is possible to prevent unwanted heat generation and a waste of energy.

The resistance of each electrothermal conversion element of the recording head may be measured to allow adjustment of the drive voltage to be applied to each electrothermal conversion element based on the measured resistance. Especially, in the case of relatively long recording heads, the resistance of the electrothermal conversion element tends to vary from nozzle to nozzle, resulting in a variation in the ink ejection amount. However, the adjustment of the application voltage based on the feedback of the resistance of each electrothermal conversion element allows ejection of ink droplets of desired size.

In the case of using a thermal recording head, the electrothermal conversion element (ejection energy generating unit) may be provided with a protective layer. The provision of a protective layer prevents erosion by ink, kogation (burnt ink components), and cavitation (destruction due to impact upon contraction of bubbles) from directly affecting the electrothermal conversion element. Thus the electrothermal conversion element is protected from damage, thereby allowing a longer service life of the electrothermal conversion element.

The sheet 3 in the sheet feed tray 4 is separated from the other sheets 3 and fed inside the apparatus body 1 by a sheet feed roller (semicircular roller) 21 and a separation pad (not shown), and then is fed to the transport mechanism 5.

The transport mechanism 5 includes a transport guide unit 23 for guiding the sheet 3 fed from the sheet feed tray upward along a guide surface 23a and for guiding the sheet 3 fed from the duplex unit 7 along a guide surface 23b, a transport roller 24 for transporting the sheet 3, a pressure roller 25 for pressing the sheet 3 against the transport roller 24, a guide member 26 for guiding the sheet 3 to the transport roller 24, a guide member 27 for guiding the returned sheet 3 to the duplex unit 7 for duplex printing, and a pressure roller 28 for pressing the sheet 3 fed from the transport roller 24.

The transport mechanism 5 further includes a transport belt 33 extending around a driving roller 31 and a driven roller 32 for guiding the sheet 3 flat under the recording head 14, a charging roller 34 for electrically charging the transport belt 33, a guide roller 35 facing the charging roller 34, a guide member (platen plate) (not shown) for guiding the transport belt 33 at a position facing the image forming unit 2, and a cleaning roller (not shown) made of a porous body or the like for removing recording liquid (ink) adhered to the transport belt 33.

The transport belt 33 is an endless belt extending around the driving roller 31 and the driven roller (tension roller) 32 and is configured to rotate in the direction (sheet transport direction) indicated by an arrow of FIG. 1.

The transport belt 31 may have a single layer structure, a double layer structure including a first layer (front layer) 33a and a second layer (back layer) 33b as shown in FIG. 4, or a structure having three or more layers. For example, the transport belt 31 may include a front layer of about 40 μm thickness serving as a sheet attracting face and a back layer (intermediate resistance layer, grounding layer). The front layer is made of a pure resin material, such as ETFE pure material, and is not subjected to resistance control. The back layer is made of the same material as the front layer but is subjected to resistance control using carbon.

The charging roller 34 is in contact with the surface of the transport belt 33 and is rotated by rotation of the transport belt 33. A high tension circuit (high voltage power supply) 114 (described below) applies a high voltage to the charging roller 34 to form a predetermined pattern.

A sheet ejection roller 38 for ejecting the sheet 3 onto the sheet ejection tray 6 is provided at the subsequent stage of the transport mechanism 5.

In the image forming unit having the above-described configuration, the transport belt 33 rotates in the direction of the arrow and is positively charged by contact with the charging roller 34 to which a high voltage is applied. The charging roller 34 switches the polarity at predetermined time intervals such that the transport belt 33 is charged to have bands of alternating polarities with a predetermined pitch.

When the sheet 3 is fed onto the transport belt 33 charged at high potential, the inside of the sheet 3 is polarized, so that the electric charges of the sheet 3 having a polarity opposite to the polarity of the charges on the transport belt 33 are moved to the surface of the sheet 3 in contact with the transport belt 33. The electric charges on the transport belt 33 and the electric charges moved to the surface of the sheet 3 electrostatically attract each other, so that the sheet 3 is electrostatically attracted to the transport belt 33. The sheet 3 is tightly attracted to the transport belt 33, and therefore warping and irregularities of the sheet 3 are corrected, so that the surface of the sheet 3 becomes essentially flat.

Figure 5A:
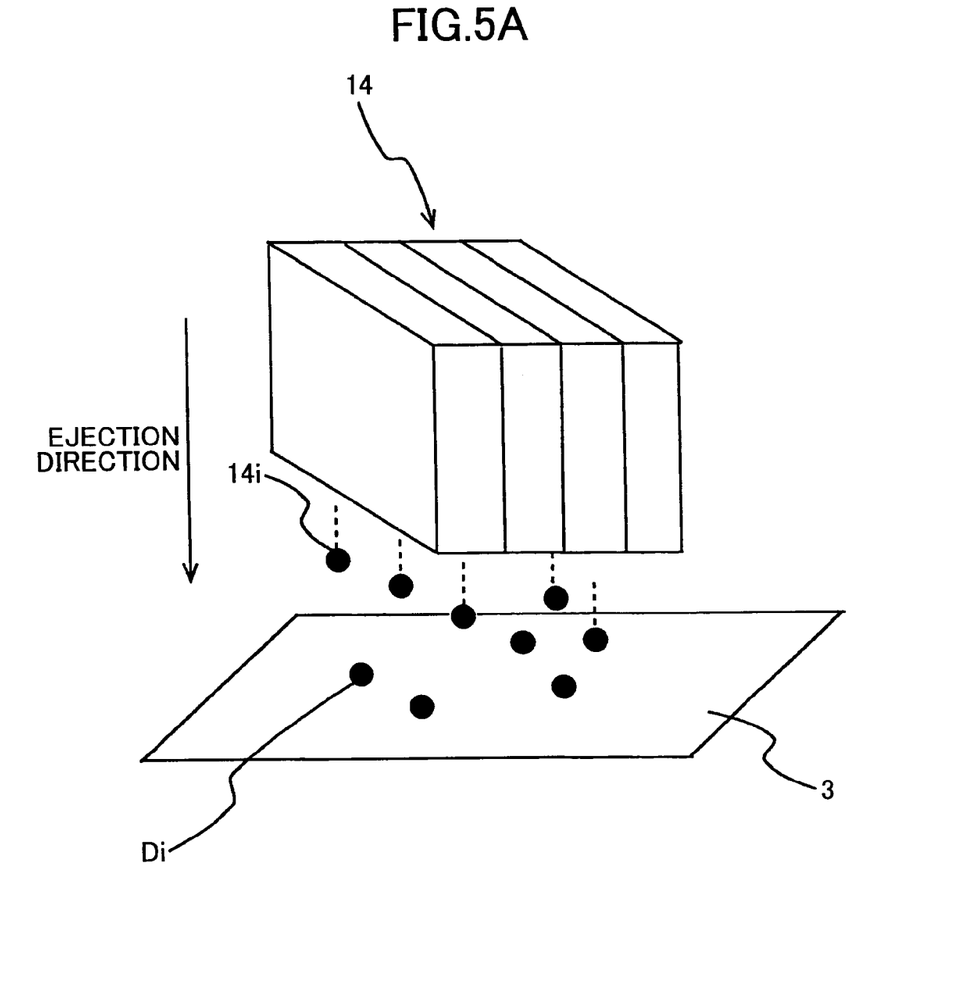
FIGS. 5A and 5B are diagrams for explaining a recording operation of the apparatus.
Figure 5B:
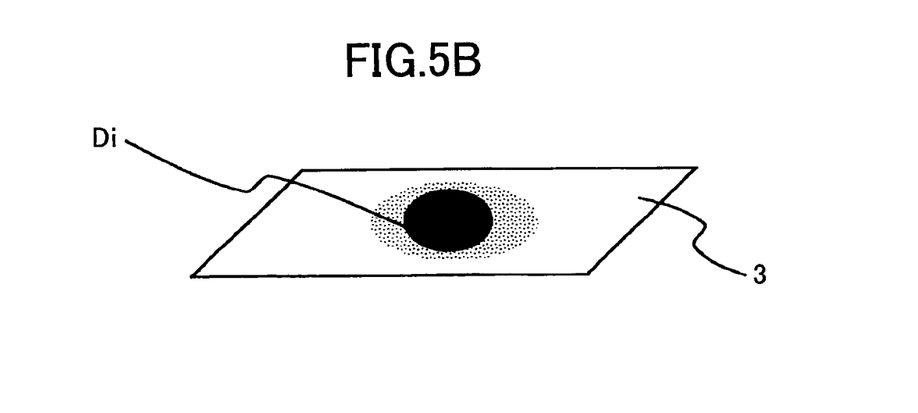

The sheet 3 is moved by rotation of the transport belt 33. The recording head 14 is driven according to an image signal while moving the carriage 13 in one direction or two directions. As shown in FIGS. 5A and 5B, the recording head 14 ejects (injects) droplets (ink droplets) 14$i$ onto the stationary sheet 3 to form dots Di, thereby recording a single line. Then the sheet 3 is moved by a predetermined distance, and the next line is recorded. The recording operation is terminated in response to a recording termination signal or a signal indicting that the trailing edge of the sheet 3 has reached a recording area. FIG. 5B is an enlarged view of the dot Di of FIG. 5A.

The sheet 3 with an image recorded thereon is ejected to the sheet ejection tray 6 by the sheet ejection roller 38.

A control unit 100 of the image processing apparatus of an embodiment of the present invention is described below with reference to FIG. 6.

Figure 6:
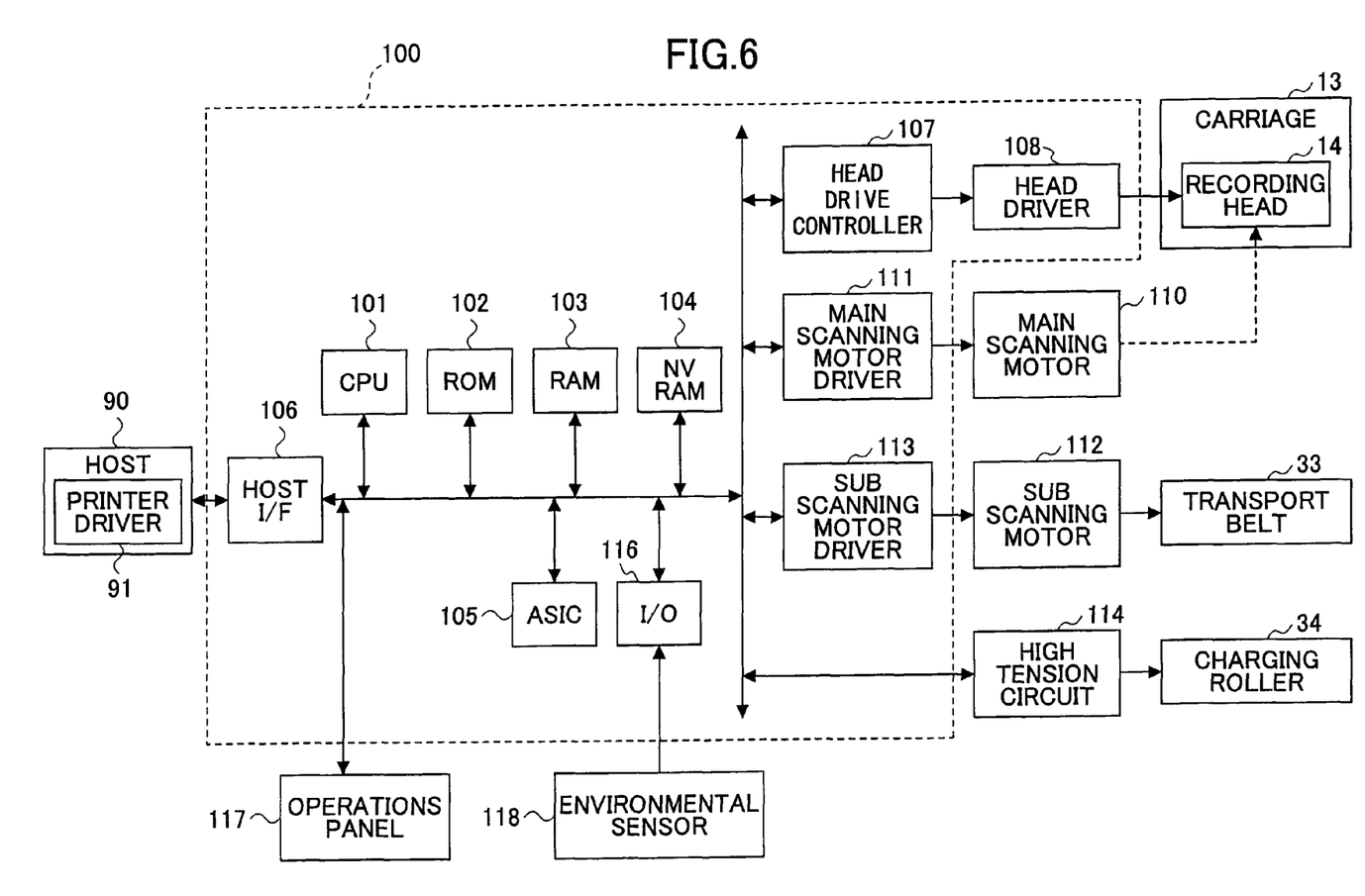
FIG. 6 is a block diagram schematically illustrating a control unit of the apparatus.

FIG. 6 is a block diagram schematically illustrating the entire control unit 100.

The control unit 100 comprises a CPU 101 that controls the apparatus, a ROM 102 that stores programs to be executed by the CPU 101 and other fixed data, a RAM 103 that temporarily stores image data and the like, a nonvolatile memory (NVRAM) 104 that retains data even when power is removed, and an ASIC 105 that processes various signals including input/output signals for image processing such as sorting and input/output signals for controlling the entire apparatus.

The control unit 100 further includes an I/F 106 for transmitting data and signals to and receiving data and signals from a host 90 (e.g., an image processing apparatus such as a personal computer), a head drive controller 107 and a head driver 108 that control and drive the recording head 14, a main scanning motor driver 111 that drives a main scanning motor 110, a sub scanning motor driver 113 that drives a sub scanning motor 112, a sub system driver (not shown) that drives a motor of the sub system, an environmental sensor 118 that detects environmental temperature and/or environmental humidity, and an I/O 116 that receives detection signals from various sensors (not shown).

An operations panel 117 for inputting and displaying information necessary for the apparatus is connected to the control unit 100. The control unit 100 controls switching on/off the high tension circuit (high voltage power supply) 114 that applies a high voltage to the charging roller 34 and switches the output polarity.

The control unit 100 receives, at the I/F 106, print data including image data from the host 90 (e.g., a data processing apparatus such as a personal computer, an image reading apparatus such as an image scanner, and an imaging apparatus such as a digital camera) through a cable or a network. A printer driver 91 of the host 90 according to an embodiment of the present invention generates and outputs the print data to the control unit 100.

The CPU 101 reads and analyzes the print data held in a receive buffer of the I/F 106. Then the ASIC 105 performs processing such as data sorting and transfers the data to the head drive controller 107. Regarding conversion of the print data into bit map data, the printer driver 91 of the host 90 expands image data into bit map data and transfers the data to the apparatus as described above. In an alternative embodiment, for example, font data may be stored in the ROM 102 to allow such conversion.

The head drive controller 107 receives one line of image data (dot pattern data) for the recording head 14, and sends the received one line of dot pattern data as serial data to the head driver 108 in synchronization with a clock signal. The head drive controller 107 also sends a latch signal to the head driver 108 with a predetermined timing.

The head drive controller 107 includes a ROM (or the ROM 102) storing pattern data of drive waveforms (drive signals) and a drive waveform generation circuit including an amplifier and a waveform generation circuit having a D/A converter for performing D/A conversion of the data of drive waveforms read from the ROM.

The head driver 108 includes a shift register that receives the clock signal and the serial data as the image data from the head drive controller 107, a latch circuit that latches the registration value of the shift register with the latch signals from the head drive controller 107, a level shift circuit (level shifter) that shifts the level of the output value of the latch circuit, and an analog switch array (switch unit), on/off of which analog switch array is controlled by the level shifter. The on/off of the analog switch array is controlled such that a desired drive waveform contained in the drive waveforms is selectively applied to the actuator unit of the recording head 14, and the recording head 14 is driven accordingly.

In an embodiment of the present invention, it is possible to print a medium (a sheet) without providing a blank space at least on a part of the periphery of the sheet.

For the periphery to be printed, ink is ejected not only within the sheet but also outside the sheet. If an attempt to eject ink onto the border of the sheet is made, the ink often cannot be ejected onto the ideal area because of a transport error of a sheet transport system or an error in driving the carriage, resulting in a blank space. To avoid such a problem, ink is ejected onto an area wider than the ideal area taking a print position error into consideration. That is, ink is ejected not only within the sheet but also outside the sheet.

The ink ejected outside the sheet does not contribute to recording and therefore is wasted. It is desirable to reduce the amount of the ink to be ejected outside the sheet.

One way of reducing the amount of ink to be ejected outside the sheet is improving the accuracy of transporting the sheet. Improving the transport accuracy allows a reduction in the area outside the sheet on which the ink is to be ejected, thereby reducing the amount of the ink to be wastefully ejected outside the sheet. More specifically, the sheet feed pitch is reduced when printing near the periphery of the sheet, thereby improving the transport accuracy.

Figure 7:
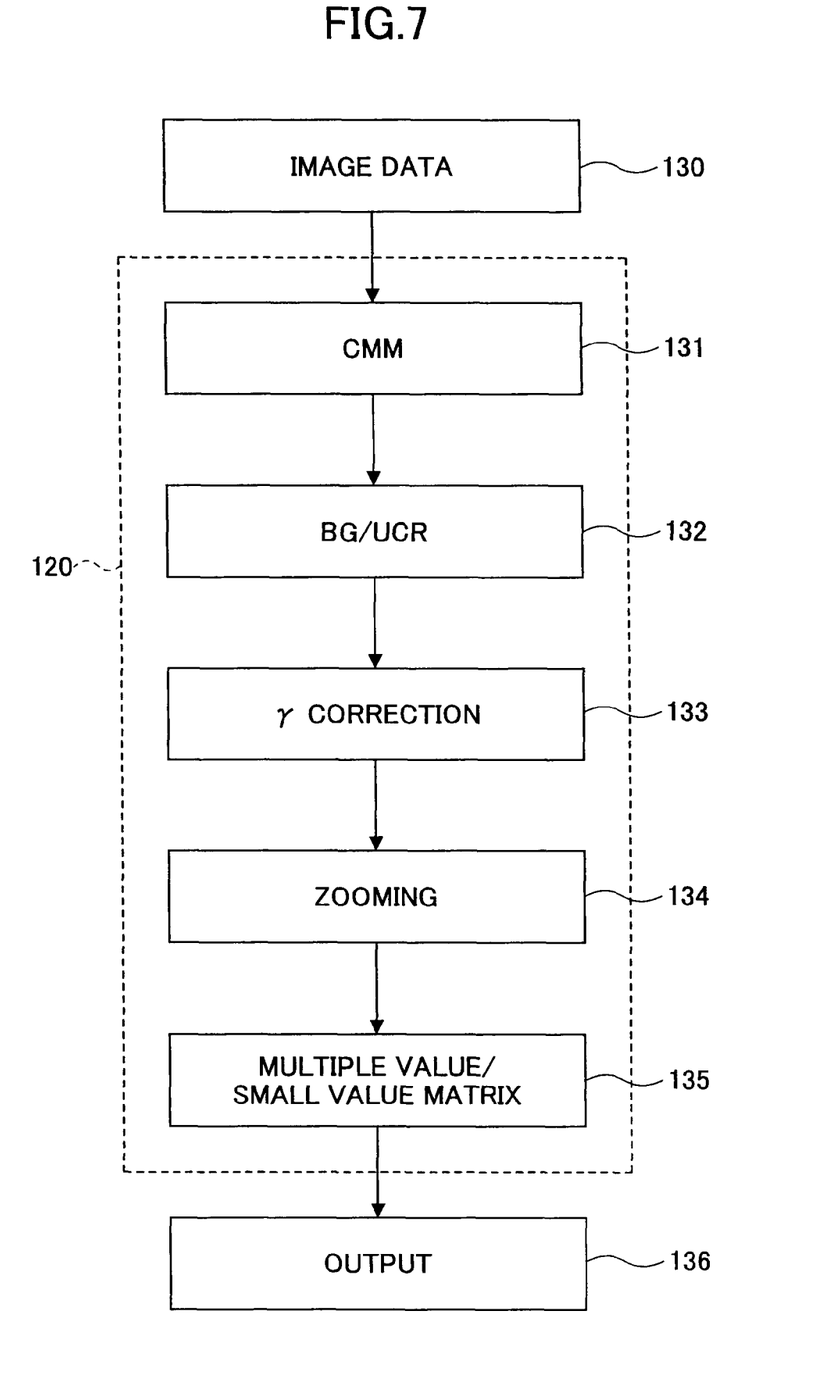
FIG. 7 is a functional block diagram illustrating an example of a configuration of a printer driver in an image processing apparatus.

An example of an image processing apparatus including a printer driver is described below with reference to FIG. 7. This image processing apparatus is the host 90 that transfers image data to be used by the image forming unit for forming an image.

The printer driver 91 of the image processing apparatus processes image data 130, which may be provided from application software, at an image processing unit 120. The image processing unit 120 includes a CMM (Color Management Module) processing unit 131 for converting a color space for monitor display to a color space for a recording apparatus (an RGB color space to a CMY color space), a BG/UCR (Black Generation/Under Color Removal) processing unit 132 for performing black generation/under color removal from CMY values, a γ correction unit 133 for performing input/output correction based on characteristics of the recording apparatus and user preferences, a zooming unit 134 for zooming according to the resolution of the recording apparatus, and a halftone processing unit 135 including a multiple value/small value matrix for converting the image data into a pattern arrangement of dots to be ejected from the recording apparatus.

Embodiment

A preferred embodiment of the present invention is described below.

The terms used hereinafter may be modified or changed by those skilled in the art without departing from the scope of the present invention.

This embodiment is directed toward saving color image formation ink by adjusting, each time recording a page, the amount of image formation ink for each object based on the image formation ink cost for black-and-white recording.

First, a preferred configuration example of an image processing apparatus according to the present invention is described with reference to FIG. 8.

Figure 8:
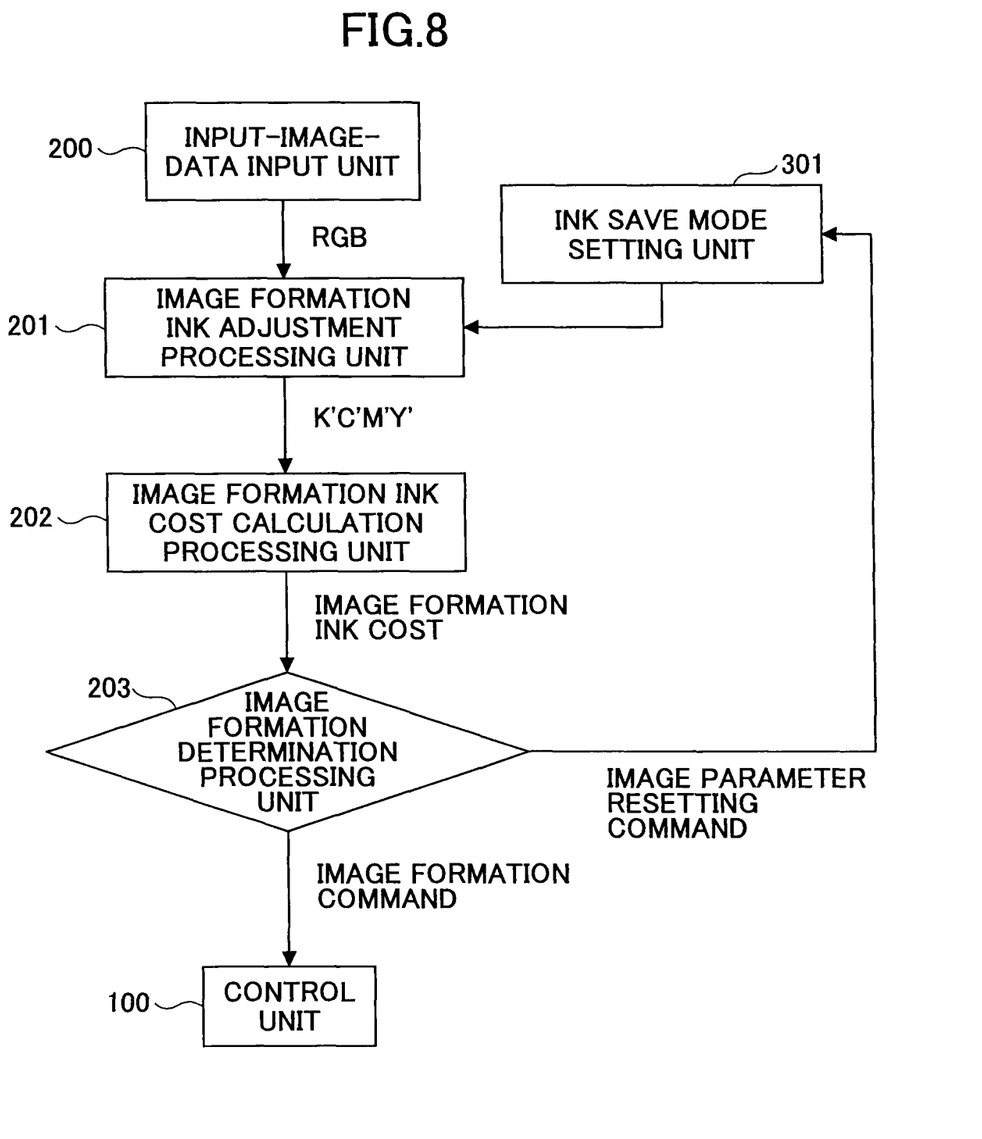
FIG. 8 is a functional block diagram illustrating an example of a configuration for an image formation ink saving process in an image processing apparatus.
Figure 9:
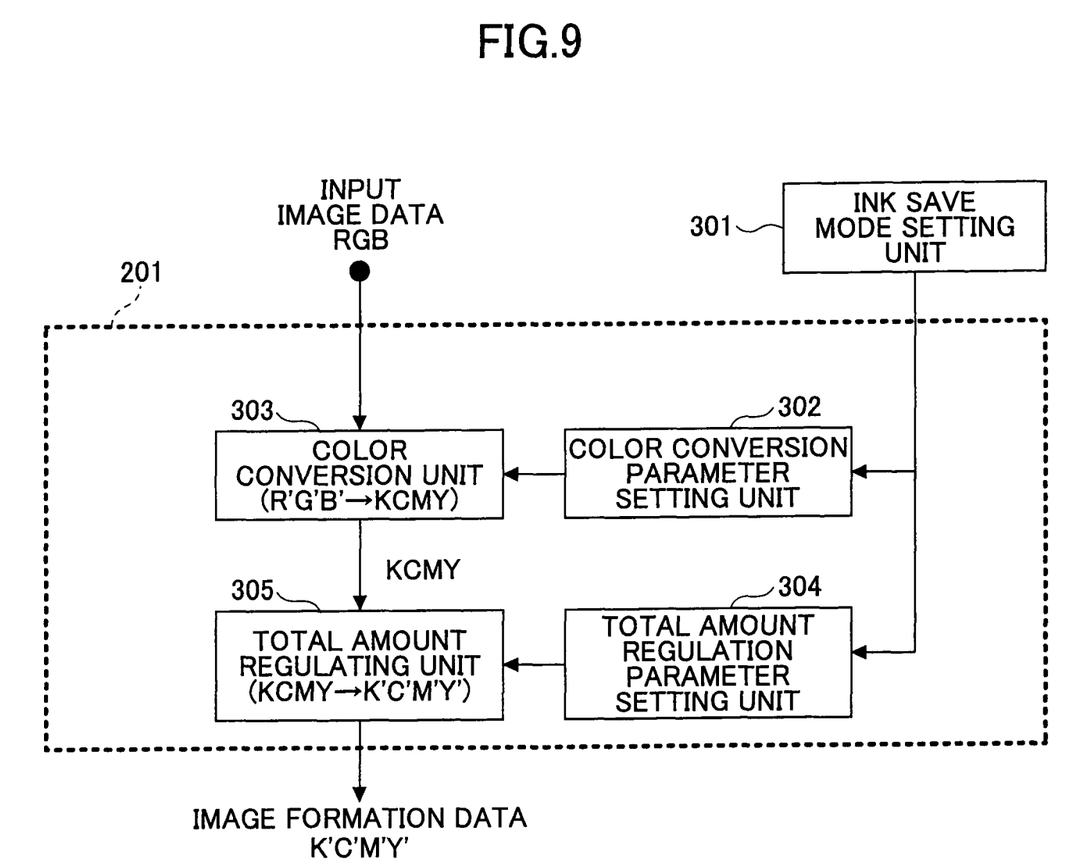
FIG. 9 is a functional block diagram illustrating an example of a configuration for adjusting the image formation ink droplet amount in an image processing apparatus.
Figure 10:
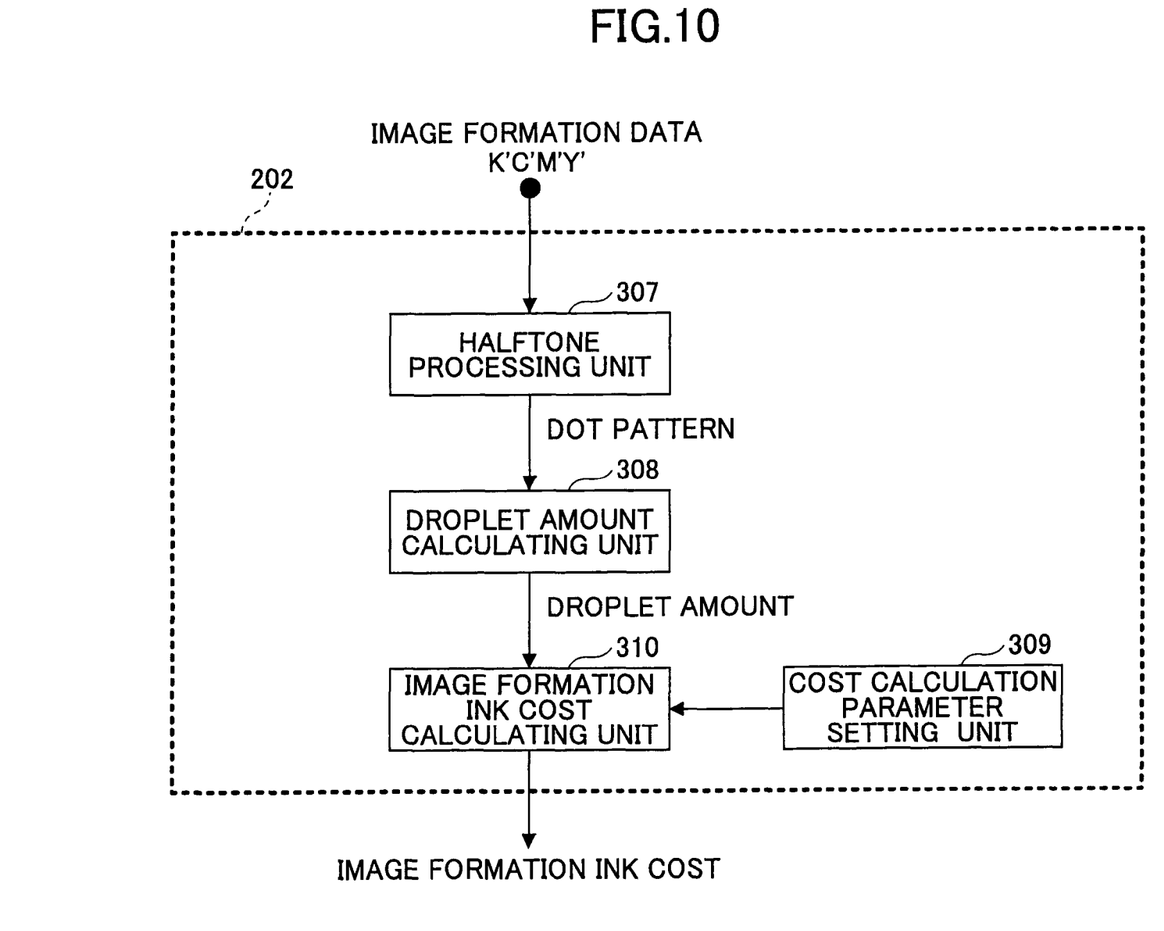
FIG. 10 is a functional block diagram illustrating an example of a configuration for calculating the image formation ink cost in an image processing apparatus.
Figure 11:
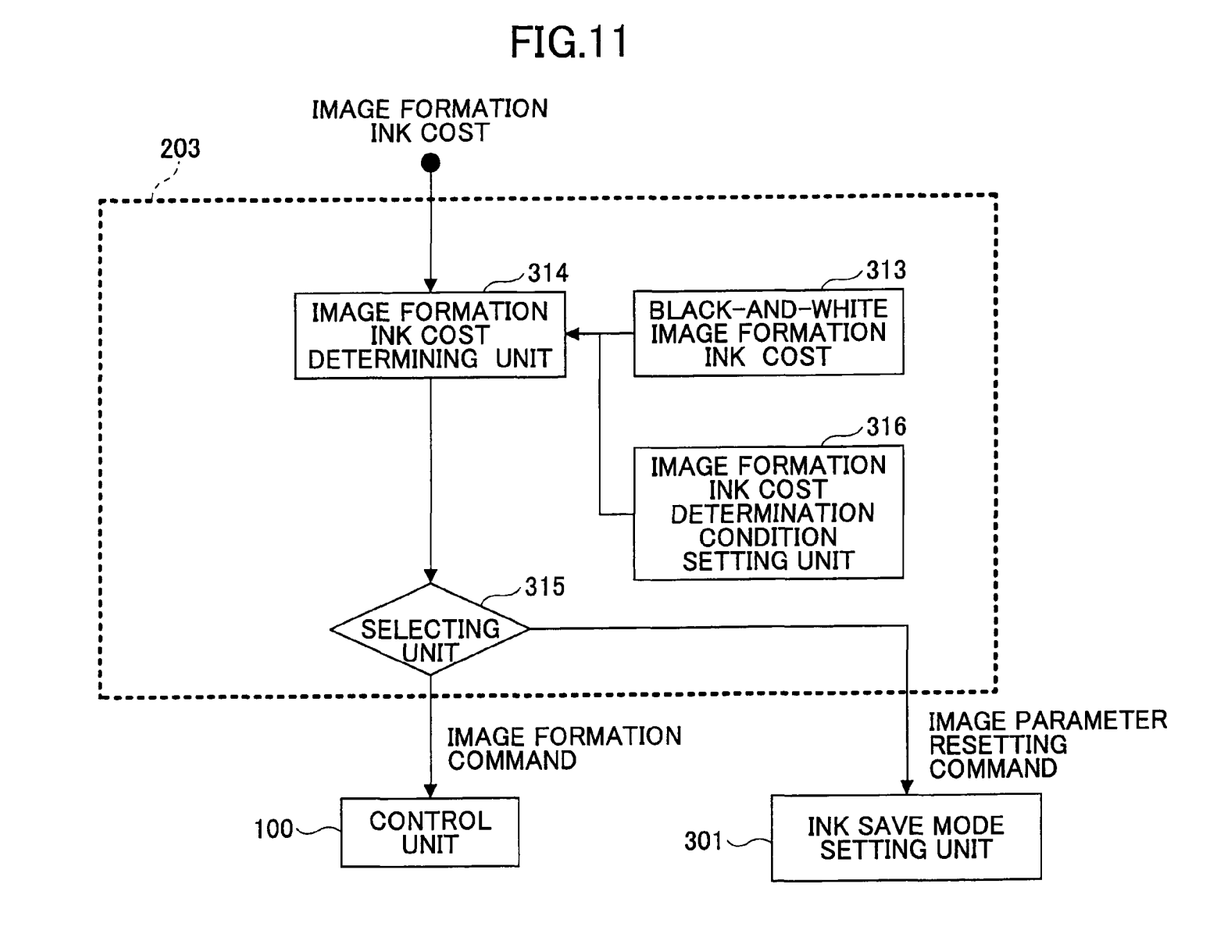
FIG. 11 is a functional block diagram illustrating an example of a configuration for selecting whether to reset an ink save mode based on a black-and-white image formation cost in an image processing apparatus.

FIG. 8 illustrates the outline and FIGS. 9, 10, and 11 illustrate details.

Image data RGB of a color space for monitor display, which are provided by application software or the like, are input to an input-image-data input unit 200. According to the settings in an ink save mode setting unit 301 as a setting unit, an image formation ink adjustment processing unit 201 as an adjusting unit adjusts the image data and converts the image data into image formation data K' C' M' Y'. The adjustment and conversion of the image data performed herein constitute an adjustment of the amount of the image formation ink droplets.

Next, an image formation ink cost calculation processing unit 202 as an arithmetic unit calculates the image formation ink cost based on the image formation data K' C' M' Y'.

Finally, an image formation determination processing unit 203 as a determining unit compares the calculated image formation ink cost and the white-and-black image formation ink cost to determine whether the calculated image formation ink cost and the white-and-black image formation ink cost satisfy a predetermined condition. If the calculated image formation ink cost and the white-and-black image formation ink cost satisfy a predetermined condition, the image formation determination processing unit 203 outputs an image formation command to the control unit 100. If not, the image formation determination processing unit 203 outputs an image formation ink readjustment command to the ink save mode setting unit 301 for readjusting the image formation ink.

An example of the image formation ink adjustment processing unit 201 as an adjusting unit is shown in FIG. 9.

A color conversion unit 303 performs conversion of the image data RGB of a color space for monitor display, which are provided by application software or the like, into a color space for a recording apparatus (conversion from the RGB color space to the CMY color space), performs BG/UCR (Black Generation/Under Color Removal) from CMYK values, and forms image-formation image intermediate data CMY. In the color conversion unit 303, a color conversion parameter is specified by the ink save mode setting unit 301 through the color conversion parameter setting unit 302. The input image data RGB are multiplied by the color conversion parameter as a coefficient. The following is an example:

$$R' = R\_max - p \times (R\_max - R)$$

$$G' = G\_max - p \times (G\_max - G)$$

$$B' = B\_max - p \times (B\_max - B) \tag{1}$$

The meaning of the signs is as follows:

R' G' B': new image data to be processed by the color conversion unit 303

R_max G_max B_max: maximum level values of the input image data p: the coefficient specified by the ink save mode setting unit 301

RGB: input image data

According to this set (1) of expressions, the entire image becomes lighter, thereby allowing a reduction of the amount of the image formation ink, resulting in reducing the cost of the image formation ink. The coefficient p is equal to or greater than 0 and less than or equal to 1.0. When the coefficient p is 1.0, the new image data is the same as the original image data.

A lower limit of the coefficient p is preferably specified because the visibility of an image might be reduced depending on the value of the coefficient p. Further, an initial value of the coefficient p is preferably specified. This is to reduce the calculation cost, because the image formation ink adjustment processing unit 201 performs processing plural times depending on the condition (described below).

It is to be noted although the method of adjusting the input image data RGB is described in this embodiment, a method of multiplying the image data KCMY by a coefficient q may alternatively be used without adjusting the input image data RGB.

A total amount regulating unit 305 receives the KCMY data from the color conversion unit 303, corrects the KCMY data to output K'C'M'Y' data according to the total amount regulation value indicating the maximum amount of the image formation ink. The total amount regulating unit 305 controls the image formation ink in order to prevent failures due to adhesion of excessive amount of image formation ink. A total amount regulation parameter is specified by the ink save mode setting unit 301 through a total amount regulation parameter setting unit 304. The total amount regulation value is multiplied by the total amount regulation parameter. The following is an example:

$$\text{Limit}' = r \times \text{Limit} \tag{2}$$

The meaning of the signs is as follows:

Limit': a new total amount regulation value to be processed by the total amount regulating unit 305 r: a coefficient specified by the total amount regulation parameter setting unit 304

Limit: the original total amount regulation value

According to this expression (2), the regulation value of the amount of the image formation ink is reduced, resulting in saving the cost of the image formation ink. The coefficient r is equal to or greater than 0 and less than or equal to 1.0. When the coefficient r is 1.0, the new total amount regulation value is equal to the original total amount regulation value.

A lower limit of the coefficient r is preferably specified because the gradation expression of dark colors might be degraded depending on the value of the coefficient r. Further, an initial value of the coefficient r is preferably specified. This is to reduce the calculation cost, because the image formation ink adjustment processing unit 201 performs processing plural times depending the condition (described below).

The coefficient p or q and the coefficient r are preferably specified for each type of the object. The coefficients p and q have an effect of making the entire image lighter. The coefficient r does not have any effect on light images but has an effect of making dark images darker to a certain level (in some cases, gradation in dark portions is removed so that so-called "gradation loss" occurs). Because there is a method for suitably adjusting image data for each object, the effects of the coefficient p or q and the coefficient r need to be selectively applied.

For example, if the object is a character, in order to ensure the visibility, it is preferable that the coefficient p or q and the coefficient r satisfy p>r or q>r and that the coefficient p or q and the coefficient r be fixed at 1.0.

If the object is a photograph, a fill, or a line, because the visibility can be sacrificed to some extent, it is preferable that the coefficient p or q and the coefficient r satisfy p<r or q<r. In this case, to ensure gradation, it is preferable to adjust the coefficient p or q while setting the coefficient r to 1.

If the object has a size greater than a predetermined size, it is preferable to greatly adjust the image formation ink amount (reduce the values of the coefficient p or q and the coefficient r). This is because the object having a size greater than the predetermined size is often a decoration and therefore lightening such a object does not cause a visibility problem.

An example of the image formation ink cost calculation processing unit 202 as an arithmetic unit is shown in FIG. 10.

The image formation ink cost calculation processing unit 202 includes a halftone processing unit 307, a droplet amount calculating unit 308, a cost calculation parameter setting unit 309 as a determining unit, and an image formation ink cost calculating unit 310, and is configured to calculate an image formation ink cost and a black-and-white image formation ink cost.

Examples of a method of calculating the image formation ink cost and a method of calculating the black-and-white image formation ink cost are described below. First, the halftone processing unit 307 generates a dot pattern. The halftone processing unit 307 includes a multiple value/small value matrix for converting the image formation data K'C'M'Y' into a pattern arrangement (dot pattern) of dots to be ejected.

The droplet amount calculating unit 308 calculates the image formation ink droplet amount based on the number of ink droplets of the dot pattern. Then the image formation ink cost calculating unit 310 multiplies the image formation ink droplet amount by an ink cost per unit ink droplet amount to calculate the image formation ink cost.

The droplet amount calculating unit 308 accumulates the value of each pixel of color conversion data on a per color basis, and calculates an ink usage based on the accumulated value of each color. The image formation ink cost calculating unit 310 multiples the calculated ink usage by the ink cost per unit ink droplet amount. In this case, the black-and-white image ink cost is previously calculated.

The ink cost per unit ink droplet amount is specified by the cost calculation parameter setting unit 309. The cost calculation parameter setting unit 309 is preferably configured to read the ink cost from one of various types of image holding units (such as a non-volatile memory) of an ink cartridge. This is to calculate the image formation ink cost with higher accuracy, because the ink cost varies depending on the type of the ink droplet and the size of the ink cartridge 15.

An example of the image formation determination processing unit 203 as a determining unit is shown in FIG. 11. The image formation ink cost determining unit 314 compares the image formation ink cost and the black-and-white recording image formation ink cost 313 to determine whether the image formation ink cost and the black-and-white recording image formation ink cost 313 satisfy a condition specified in an image formation ink cost determination condition setting unit 316. Then a selecting unit 315 determines whether to reset the image parameter based on the determination result of the image formation ink cost determining unit 314. In the case of resetting the image parameter, the selecting unit 315 sends an image parameter resetting command to the ink save mode setting unit 301. In the case of not resetting the image parameter, the selecting unit 315 sends an image formation command to the control unit 100.

The black-and-white recording image formation ink cost 313 holds, as information, the black-and-white image formation ink cost calculated by the above-described arithmetic unit.

The image formation ink cost determination condition setting unit 316 specifies s % (s indicating a value greater than 0) of the image formation ink cost for black-and-white image recording in the image formation ink cost determining unit 314. Then the image formation ink cost determining unit 314 compares s % of the image formation ink cost for black-and-white image recording with the image formation ink cost.

It is preferable that s % be 100%. In this case, it is possible to record a color image with the same image forming cost as the black-and-white image recording, thereby saving ink. The s may be specified by a user using an input unit such as an operations unit.

As a result of the comparison made by the image formation ink cost determining unit 314, if s % of the image formation ink cost for black-and-white recording is equal to the image formation ink cost, the selecting unit 315 sends an image formation command to the control unit 100. If not, the selecting unit 315 sends an image formation parameter resetting command (a command to reset the coefficient p or q and the coefficient r) to the ink save mode setting unit 301.

Having received the image parameter resetting command, the ink save mode setting unit 301 sets values, which are not used last time, to the coefficient p or q and the coefficient r. In this way, the coefficients are reset repeatedly until s % of the image formation ink cost for black-and-white image recording becomes equal to the image formation ink cost. In the case where values available as the setting values of the coefficient do not include values that make s % of the image formation ink cost for black-and-white image recording equal to the image formation ink cost, the image formation ink adjustment is performed using the setting values of the coefficients that make s % of the image formation ink cost for black-and-white image recording the closest to the image formation ink cost.

The image processing apparatus and the image processing method of the above-described embodiments of the present invention may be provided as a program or a recording medium storing the program for realizing the apparatus and the method.

Examples of recording medium include flexible disks, CD-ROMs, magneto-optical disks, IC cards, ROM cartridges, punched cards, materials with barcodes or other codes printed thereon, internal storage devices (memories such as RAMs and ROMs) and external storage devices for computers, and a variety of other computer readable media. The present invention may be embodied as a program providing device that provides the computer program to a computer through the above-described I/F (communication pathway).

The present application is based on Japanese Priority Application No. 2007-181506 filed on Jul. 10, 2007, with the Japanese Patent Office, the entire contents of which are hereby incorporated herein by reference.

What is claimed is:
1. An image processing apparatus, comprising:
an adjusting unit configured to convert input color image data into color image formation data;
an arithmetic unit configured to calculate a color image formation ink cost based on the converted color image formation data; and a first determining unit, including a processor, configured to compare the calculated color image formation ink cost with a black-and-white image formation ink cost, wherein when a comparison in the first determining unit does not satisfy a predetermined condition, the calculated color image formation ink cost is adjusted by modifying the converted color image formation data based on a determination result of the first determining unit; and, wherein the adjusting unit corrects R, G, and B values of the input image data by multiplying the R, G, and B values by a coefficient p, p being equal to or greater than 0 and less than or equal to 1.0, according to $R'=R\_max-p\times(R\_max-R)$, $G'=G\_max-p\times(G\_max-G)$, and $B'=B\_max-p\times(B\_max-B)$, respectively, wherein R', G', and B' represent corrected R, G, and B values, respectively, and R_max, G_max, and B_max represent maximum level values of the R, G, and B values, respectively, of the input image data.

2. The image processing apparatus as claimed in claim 1, wherein the first determining unit determines whether the calculated color image formation ink cost is equal to s % of the black-and-white image formation ink cost, s being a user specified value.

3. The image processing apparatus as claimed in claim 1, further comprising:

a setting unit configured to specify a value of s; and
an input unit configured to allow a user to change a specified value of s.

4. The image processing apparatus as claimed in claim 3, wherein the arithmetic unit calculates the color image formation ink cost by multiplying an image formation ink amount by an ink cost per unit ink amount.

5. The image processing apparatus as claimed in claim 4, wherein the arithmetic unit includes a second determining unit configured to acquire type information from an ink cartridge and determine the ink cost per unit ink amount based on the acquired type information.

6. The image processing apparatus as claimed in claim 1, wherein the adjusting unit corrects C, M, Y, and K values of the input image data by multiplying the C, M, Y, and K values by a coefficient q, q being equal to or greater than 0 and less than or equal to 1.0.

7. The image processing apparatus as claimed in claim 6, wherein the adjusting unit includes a total amount regulating unit configured to adjust an image formation ink amount, and wherein the adjusting unit multiplies a total amount regulating value to be used for the adjustment by a coefficient r, r being equal to or greater than 0 and less than or equal to 1.0.

8. The image processing apparatus as claimed in claim 6, further comprising:

a holding unit configured to hold initial values of the coefficient p and a coefficient r as rewritable information,
wherein the adjusting unit includes a total amount regulating unit configured to adjust an image formation ink amount,
wherein the adjusting unit multiplies a total amount regulating value to be used for the adjustment by the coefficient r, r being equal to or greater than 0 and less than or equal to 1.0, and
wherein the adjusting unit acquires, for the adjustment of the image formation ink amount, the initial values of the coefficient p and the coefficient r held in the holding unit as the coefficients p and r or acquires the coefficients p and r via a network or a record holding device.

9. The image processing apparatus as claimed in claim 8, wherein the holding unit holds upper limits or lower limits of the coefficient p and the coefficient r to be used for the adjustment of the image formation ink amount as rewritable information.

10. The image processing apparatus as claimed in claim 8, further comprising:

a setting unit configured to specify a value of s; and
an input unit configured to allow a user to change a specified value of s,
wherein the adjusting unit adjusts the values of the coefficient p and the coefficient r based on a value of s specified by the setting unit.

11. The image processing apparatus as claimed in claim 8, wherein the adjusting unit adjusts the values of the coefficient p and the coefficient r based on a type and a size of an object of an image.

12. A method of controlling an image processing apparatus that performs an operation, comprising:

converting, input color image data into color image formation data;
calculating, a color image formation ink cost based on the converted color image formation data;
comparing, the calculated color image formation ink cost with a black-and-white image formation ink cost; and
adjusting, with a processor, the calculated image formation ink cost by modifying the color image formation data based on a determination result in the determining step, when the comparison in the determining unit does not satisfy a predetermined condition, and,
wherein the adjusting corrects R, G, and B values of the input image data by multiplying the R, G, and B values by a coefficient p, p being equal to or greater than 0 and less than or equal to 1.0, according to $R'=R\_max-p\times(R\_max-R)$, $G'=G\_max-p\times(G\_max-G)$, and $B'=B\_max-p\times(B\_max-B)$, respectively, wherein R', G', and B' represent corrected R, G, and B values, respectively, and R_max, G_max, and B_max represent maximum level values of the R, G, and B values, respectively, of the input image data.

13. A non-transitory computer-readable recording medium encoded with computer-executable instructions, wherein the instructions, when executed by a processor, cause the processor to execute a method comprising:

converting input color image data into color image formation data;
calculating a color image formation ink cost based on the converted color image formation data;
comparing the calculated color image formation ink cost with a black-and-white image formation ink cost; and
adjusting the calculated image formation ink cost by modifying the color image formation data based on a result of a comparison of the calculated color image formation cost with the black-and-white image formation ink cost, when the comparison does not satisfy a predetermined condition.
wherein the adjusting corrects R, G, and B values of the input image data by multiplying the R, G, and B values by a coefficient p, p being equal to or greater than 0 and less than or equal to 1.0, according to $R'=R\_max-p\times(R\_max-R)$, $G'=G\_max-p\times(G\_max-G)$, and $B'=B\_max-p\times(B\_max-B)$, respectively, wherein R', G', and B' represent corrected R, G, and B values, respectively, and R_max, G_max, and B_max represent maximum level values of the R, G, and B values, respectively, of the input image data.

14. The image processing apparatus as claimed in claim 1, wherein the converted color image formation data includes a coefficient p, a coefficient q, and a coefficient r, and at least one of the coefficient p, the coefficient q, and the coefficient r are modified such that the calculated color image formation ink cost is adjusted to be substantially equal to the black-and-white image formation ink cost.

15. The image processing apparatus as claimed in claim 1, wherein the calculated color image formation ink cost is adjusted by repeatedly resetting an image parameter until s% of the black-and-white image formation ink cost for black-and-white image recording becomes equal to the color image formation ink cost.

16. The image processing apparatus as claimed in claim 7, further comprising:
   a holding unit configured to hold initial values of the coefficient q and a coefficient r as rewritable information,
   wherein the adjusting unit includes a total amount regulating unit configured to adjust an image formation ink amount,
   wherein the adjusting unit multiplies a total amount regulating value to be used for the adjustment by the coefficient r, r being equal to or greater than 0 and less than or equal to 1.0, and
   wherein the adjusting unit acquires, for the adjustment of the image formation ink amount, the initial values of the coefficient q and the coefficient r held in the holding unit as the coefficients q and r or acquires the coefficients q and r via a network or a record holding device.

17. The image processing apparatus as claimed in claim 16, wherein the holding unit holds upper limits or lower limits of the coefficient q and the coefficient r to be used for the adjustment of the image formation ink amount as rewritable information.

18. The image processing apparatus as claimed in claim 16, further comprising:
   a setting unit configured to specify a value of s; and
   an input unit configured to allow a user to change a specified value of s,
   wherein the adjusting unit adjusts the values of the coefficient q and the coefficient r based on a value of s specified by the setting unit.

19. The image processing apparatus as claimed in claim 16, wherein the adjusting unit adjusts the values of the coefficient q and the coefficient r based on a type and a size of an object of an image.

* * * * *